United States Patent
Ross

(10) Patent No.: US 8,428,932 B2
(45) Date of Patent: Apr. 23, 2013

(54) CONNECTED TEXT DATA STREAM COMPRISING COORDINATE LOGIC TO IDENTIFY AND VALIDATE SEGMENTED WORDS IN THE CONNECTED TEXT

(76) Inventor: Nathan S. Ross, Dayton, OH (US)

(*) Notice: Subject to any disclaimer, the term of this patent is extended or adjusted under 35 U.S.C. 154(b) by 875 days.

(21) Appl. No.: 12/171,341

(22) Filed: Jul. 11, 2008

(65) Prior Publication Data

US 2009/0157387 A1 Jun. 18, 2009

Related U.S. Application Data

(63) Continuation of application No. 11/955,688, filed on Dec. 13, 2007, now abandoned.

(60) Provisional application No. 60/869,794, filed on Dec. 13, 2006.

(51) Int. Cl.
*G06F 17/27* (2006.01)
*B41J 5/06* (2006.01)
*G06K 9/34* (2006.01)

(52) U.S. Cl.
USPC ............................. 704/9; 400/110; 382/177

(58) Field of Classification Search ............... 704/9
See application file for complete search history.

(56) References Cited

U.S. PATENT DOCUMENTS

| | | | | |
|---|---|---|---|---|
| 4,750,122 A | * | 6/1988 | Kaji et al. | 704/1 |
| 5,448,474 A | * | 9/1995 | Zamora | 704/9 |
| 5,806,021 A | * | 9/1998 | Chen et al. | 704/9 |
| 5,832,530 A | * | 11/1998 | Paknad et al. | 715/235 |
| 6,185,524 B1 | * | 2/2001 | Carus et al. | 704/9 |
| 6,374,210 B1 | * | 4/2002 | Chu | 704/9 |
| 7,092,567 B2 | * | 8/2006 | Ma et al. | 382/177 |

OTHER PUBLICATIONS

Hae-Kwang Kim (Journal of Visual Communications and Image Presentation, vol. 7, No. 4, Dec. 1996, pp. 336-344).*

* cited by examiner

*Primary Examiner* — Talivaldis Ivars Smits
*Assistant Examiner* — Farzad Kazeminezhad
(74) *Attorney, Agent, or Firm* — Neustel Law Offices

(57) ABSTRACT

A connected text data system for efficiently and accurately translating connected text. The connected text data system includes inputting or receiving connected text, transmitting the connected text to a text iterator, scanning the connected text, identifying a plurality of words in the connected text comprising a coordinate logic to help parse connected text matches into separated text by invalidating words with overlapping coordinates, and translating the connected text to separated text by adding a space between each of the plurality of words.

14 Claims, 2 Drawing Sheets

CONNECTED TEXT DATA STREAM COMPRISING COORDINATE LOGIC TO IDENTIFY AND VALIDATE SEGMENTED WORDS IN THE CONNECTED TEXT

CROSS REFERENCE TO RELATED APPLICATIONS

I hereby claim benefit under 35 U.S.C. 120 of U.S. application Ser. No. 11/955,688 filed Dec. 13, 2007 and under 35 U.S.C. Section 119(e) of U.S. Provisional Application No. 60/869,794 filed Dec. 13, 2006. This application is a continuation of the Ser. No. 11/955,688 filed Dec. 13, 2007, now abandoned and 60/869,794 filed on Dec. 13, 2006. The Ser. No. 11/955,688 application is currently pending and the 60/869,794 is now expired after one year from its filing date. The Ser. No. 11/955,688 and 60/869,794 are hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to text data systems and more specifically it relates to a connected text data system for efficiently and accurately translating connected text.

With the proliferation of connections to the Internet by a rapidly growing number of individuals, the viability of the Internet as a widely accepted medium of communication and business activity has increased correspondingly. The Internet is comprised of a global computer network allowing various types of data to be transmitted including but not limited to video, audio and graphical images. The type of connection the individual has to the Internet determines the overall quality and speed of their Internet experience. With increasing bandwidth and decreasing prices of Internet connections available to consumers such as DSL, ISDN, T1, T3 and cable modems, increased usage and quality of Internet related activities will inevitably occur.

2. Description of the Related Art

Any discussion of the prior art throughout the specification should in no way be considered as an admission that such prior art is widely known or forms part of common general knowledge in the field.

Conventional text analysis systems are often times used in software products such as MICROSOFT WORD to identify misspellings or improper grammar. Other types of text analysis systems are used by Internet-based search engines such as GOOGLE to identify misspelled words and make suggestions to the user for a replacement word.

While conventional text analysis systems are suitable for the use intended they are not capable of receiving a string of connected text and identify multiple words within the connected text. Conventional text analysis systems require the usage of spaces to enter, store and transmit text information (e.g. a search query, a database of records, etc.). The usage of separated text requires additional data storage space and requires the unnecessary entry of spaces between words thereby reducing the efficiency of an individual typing.

In these respects, the connected text data system according to the present invention substantially departs from the conventional concepts and designs of the prior art, and in so doing provides a system primarily developed for the purpose of efficiently and accurately translating connected text.

BRIEF SUMMARY OF THE INVENTION

In view of the foregoing disadvantages inherent in the known types of text analysis systems now present in the prior art, the present invention provides a new connected text data system wherein the same can be utilized for efficiently and accurately translating connected text.

The general purpose of the present invention, which will be described subsequently in greater detail, is to provide a new connected text data system that has many of the advantages of the text analysis systems mentioned heretofore and many novel features that result in a new connected text data system which is not anticipated, rendered obvious, suggested, or even implied by any of the prior art text analysis systems, either alone or in any combination thereof.

The invention relates to a text analysis system which includes inputting or receiving connected text, transmitting the connected text to a text iterator, scanning the connected text, identifying a plurality of words in the connected text, and translating the connected text to separated text by adding a space between each of the plurality of words.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a connected text data system that will overcome the shortcomings of the prior art systems.

A second object is to provide a connected text data system for efficiently and accurately translating connected text.

Another object is to provide a connected text data system that may be utilized in various text based systems including but not limited to websites, search engines, internal networks, software programs, word processors, data compressors, spell checkers, grammar checkers, text retrieval, software coding and the like.

An additional object is to provide a connected text data system that automatically translates text without spaces and/or punctuation (i.e. "connected text").

A further object is to provide a connected text data system that translates text without spaces into text with spaces.

Another object is to provide a connected text data system that translates text without punctuation into text with punctuation.

Another object is to provide a connected text data system that is capable of translating various combinations of text including characters, numbers, punctuation, words and spaces.

Another object is to provide a connected text data system that reduces the amount of data storage required to store text data by removing spaces and punctuation.

Another object is to provide a connected text data system that utilizes a validation system to improve translation accuracy.

Another object is to provide a connected text data system that uses grammarless logic consisting of coordinate logic to parse and process connected text matches into separated text.

Another object is to provide a connected text data system that may be utilized with various languages including the English language.

Another object is to provide a connected text data system that improves typing speed by automatically spacing words.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs), DVDs (digital video discs), and computer instruction signals embodied in a transmission medium (with or without a carrier wave upon which the signals are modulated). For example, the transmission medium may include a communications network, such as the Internet.

The connected text data system in the present invention generally includes inputting or receiving connected text, transmitting the connected text to a text iterator, scanning the connected text, identifying a plurality of words in the connected text, and translating the connected text to separated text by adding a space between each of the plurality of words.

A. Exemplary Computer.

The computer may be comprised of any electronic device capable of receiving, storing and transmitting data such as but not limited to a personal computer, a server computer, a workstation computer, or various other types of computers. It can be appreciated that the computer may be comprised of various other electronic devices including but not limited to mobile phones, telephones, personal digital assistants (PDAs), handheld wireless devices, smart phones, television units, television receivers, cable television receivers, pagers, communication devices, and digital satellite receiver units.

B. Exemplary Communications Network.

Figure 1:
FIG. 1 is a block diagram illustrating the communications between a computer and a text iterator via a communications network.
Figure 2:
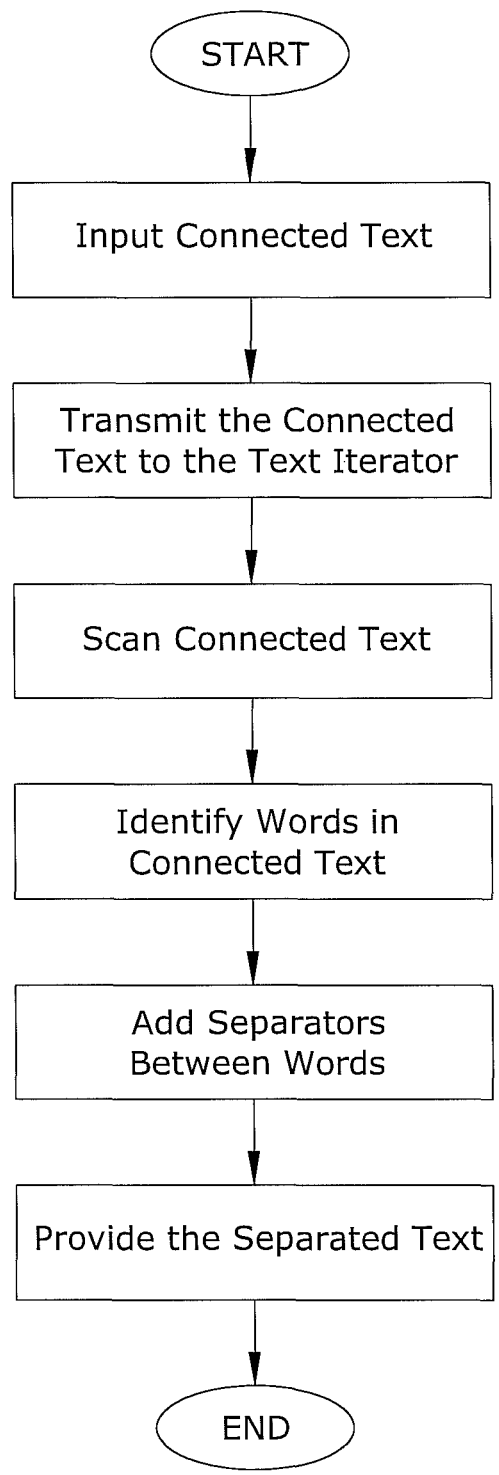
FIG. 2 is a flowchart illustrating a preferred embodiment of the present invention.

As shown in FIG. 1, the communications network for the present invention. The communications network may be comprised of a global computer network (e.g. the Internet) or a local area network. The communications between the computer and the text iterator may also be accomplished via various communication systems such as but not limited to wireless, Ethernet, cable, direct connection, telephone lines, and satellite.

The present invention may also be utilized upon wide area networks (WAN), campus area networks (CAN), metropolitan-area networks (MAN), and home area networks (HAN). Various protocols may be utilized by the electronic devices for communications such as but not limited to HTTP, SMTP, FTP and WAP (Wireless Application Protocol). The present invention may be implemented upon various wireless networks such as but not limited to CDPD, CDMA, GSM, PDC, PHS, TDMA, FLEX, REFLEX, IDEN, TETRA, DECT, DATATAC, and MOBITEX. The present invention may also be utilized with online services and internet service providers such as AMERICA ONLINE (AOL), COMPUSERVE, and the like. The present invention may also be utilized upon various types of internal search engines and external search engines (e.g. GOOGLE, YAHOO). The present invention preferably utilizes the Internet for transmitting data, however it can be appreciated that as future technologies are created that various aspects of the invention may be practiced with these improved technologies.

C. Web Browsers.

The present invention may be implemented and viewed upon various types and brands of web browsers such as but not limited to MICROSOFT INTERNET EXPLORER, NETSCAPE NAVIGATOR, OPERA, AMAYA, ARENA, LYNX, HOTJAVA, MOZILLA, ICAB, MICROSOFT OUTLOOK, and MICROSOFT OUTLOOK EXPRESS. Browsers for handheld wireless devices, often times referred to as "microbrowsers", are also capable of implementing the present invention. A browser is typically capable of displaying/playing various types of content including but not limited text, graphic, audio and multimedia.

D. Text Iterator.

The text iterator of the present invention is comprised of any software program capable of receiving, analyzing and adding spaces (and punctuation) within a spaceless string of text. The text iterator may be hosted on an external web server or an internal server. The text iterator may also be hosted on the computer where the connected text is entered. The text iterator may be comprised of an independent software program or a module within another software program.

1. Inputting and/or Receiving Spaceless Text.

A user or an automated software program inputs the connected text into a computer. The connected text is comprised of a text string having a plurality of characters (e.g. a, b, c, 1, 2, 3) with no separators between any of the words or with no separators between at least one pair of words. The separators may be comprised of a space character, hyphen, tab or other required punctuation. After a user enters the connected text into the computer, the connected text is transmitted to the text iterator for translation.

2. Identifying a Plurality of Words Within Spaceless Text.

After receiving the connected text, the text iterator scans the connected text and then identifies a plurality of words in the connected text testing if more than one word is present within the connected text against a dictionary. The process of identifying a plurality of words includes identifying distinct words within the connected text that require a separator (e.g. a space, a hyphen, a comma, etc.) and correctly assigning separators.

The step of identifying a plurality of words within the connected text is preferably accomplished by performing a triangle scan iteration followed by comparing the potential words to a dictionary and/or grammar checking system. The triangle scan iteration is a permutation scan that includes selecting all the combinations of individual portions of the connected text either randomly or systematically. The triangle scan (or pyramid scan) can be performed in a forward, reverse or both forward/reverse manner. The scan is preferably performed in a linear manner, but can be performed in a non-linear, random manner. The scan can be performed line by line or all at one time. For example, the following connected text "howareyou" could be analyzed as follows. In the following example the iterator starts at the first character and adds successive characters then shifts left or right a character and continues appending characters until no more text is found.

Triangle Scan Forward Iteration Example (Connected Text="howareyou"):
h
ho
how
howa
howar
howare
howarey
howareyo
[shift right one letter]
o
ow
owa
owar
[shift right one letter]
a
ar
are
arey
areyo
areyou
[shift right one letter]
w
wa
war
ware
warey
wareyo
wareyou
[shift right one letter]
e
ey
eyo
eyou
[shift right one letter]
y
yo
you
[shift right one letter]
o
ou
[shift right one letter]
u Each of the potential words identified by the triangle scan iteration are identified as a coordinate or coordinate pair within the connected text to identify the position within the connected text. The text iterator then identifies all possible words within the triangulated text using a word match table such as a dictionary or database (or other word identifying tool). The text iterator then stores the matches in a match stack or match list that can be ordered by length and starting and ending word position coordinates and text word attributes including but not limited to type and language.

The text iterator then permutates the identified match words and determines which of the identified words that do not overlap one another. In the example above, the text iterator determines that the identified word "war" overlaps with the identified word "how" and would determine that one of the two words is not proper. The text iterator determines also that the word "a" overlaps with the word "are" and determines that one of the two words are not proper through scoring.

After analyzing the various potential word combinations of the identified words and using the coordinate string in the above example, the text iterator determines that the only combination of words that do not overlap is "how are you".

The text iterator also preferably selects a longer word match or phrase match over a shorter word match. For example, the connected text "connecttothenetwork" would be translated to "connect to the network" which uses the longer word "network" rather than "connect to the net work" which uses a combination of two smaller words "net" and "work". Fuzzy matching and fuzzy logic scoring may be utilized to process and score the matched words within a match stack based on word scores.

3. Translating the Connected Text.

After the proper plurality of words are potentially identified within the connected text, the connected text is then translated by adding a separator marker (e.g. space, hyphen, comma) between at least two of the plurality of words. It is preferable that a separator be added between each of the plurality of words but is not required for the present invention. In addition, any missing punctuation within the connected text is preferably identified and added to the plurality of words within the connected text.

In the above example, a first space would be added between the identified words "how" and "are" along with a second spaced between the identified words "are" and "you". In addition, the text iterator is capable of identifying that the combination of words "how are you" is a question and add a question mark ("?") at the end of the separated words output.

Furthermore, the text iterator can identify that the separated words form a complete sentence and that the first word needs to be capitalized thereby capitalizing the word "How" to form the complete separated phrase "How are you?". It can be appreciated that various other types of grammar may be used within the present invention such as commas, apostrophes (e.g. the connected word "cant" being translated to "can't") and the like.

4. Validating the Separated Text.

After the text iterator translates the connected text into separated words, it is preferable to validate the words within the coordinate string. A coordinate string is a list of starting ending character coordinate pairs for each word. Coordinate strings start at zero or one and end with the last character number of the string. Coordinate strings also have a ending index for a previous word that is one less than the starting index of the next word. Coordinate strings invalidate overlapping matches. An example of a valid coordinate string is the string "TheDay" whose coordinate string would be the coordinates (0,2) and (3,5) in the list ["The" (0,2), "Day" (3,5)] in the string "TheDay."Validation of the separated words can include the usage of a grammar checker (similar to grammar checkers used in MICROSOFT WORD produced by Microsoft Corporation and other text editing programs which are incorporated by reference herein). The purpose of validating the separated text is to ensure that there are no ambiguous words utilized within the separated text and to differentiate multiple matches. Validation also involves selecting the best match. For example, if the separate text forms the phrase "test,numbers" without a space, the text iterator would determine that a space is required after the comma and add the space forming "test, numbers".

5. Using the Separated Text.

After the connected text has been translated to separated text, the separated text is then utilized in an appropriate manner. For example, the separated text may be provided to a separate or integral software application that utilizes the separated text. The separated text may also be utilized for searching a database of corresponding separated text. Alternatively, text received that is spaceless may be used to search a database of corresponding spaced or punctuated connected text. There are various applications for the separated text including but not limited to spaceless interpreters or editors.

It can be appreciated that the above process may be reversed wherein separated text may be compressed to connected text. The connected text may then be stored within a database or other manner resulting in a data savings of approximately ten-percent. For example, a user could enter separated text into a search engine and the search engine would remove the separators to allow for searching of connected text within a database.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A method of analyzing connected text, said method comprising the steps of:
   inputting connected text;
   transmitting said connected text to a text iterator hosted on a computer;
   scanning said connected text;
   identifying a plurality of words in said connected text;
      wherein said step of identifying a plurality of words in said connected text is comprised of performing a triangle scan iteration;
   wherein said triangle scan iteration is comprised of selecting various combinations of individual portions of said connected text;
   wherein said triangle scan iteration is performed in both a forward and reverse manner;
   wherein said triangle scan iteration is performed in a nonlinear, random manner;
   and translating said connected text to separated text by adding a separator between at least two of said plurality of words;
   wherein said step of identifying a plurality of words includes creating a plurality of word matches sorted by a coordinate, permutating said plurality of word matches, and identifying a coordinate string with no overlapping characters containing two or more whole words.

2. The method of analyzing connected text of claim 1, including the step of providing said separated text to a software application or a spaceless search engine.

3. The method of analyzing connected text of claim 1, wherein said separator is comprised of a space.

4. The method of analyzing connected text of claim 1, wherein said step of inputting connected text is comprised of inputting a text string without a space being input between at least two words.

5. The method of analyzing connected text of claim 1, wherein said step of inputting connected text is comprised of inputting a text string without any spaces being input.

6. The method of analyzing connected text of claim 1, including the step of validating the words within said coordinate string.

7. The method of analyzing connected text of claim 1, including the steps of identifying missing punctuation within said connected text and adding said missing punctuation.

8. A method of analyzing connected text, said method comprising the steps of:
   receiving connected text;
   transmitting said connected text to a text iterator hosted on a computer;
   scanning said connected text and creating a match list of said text;
   identifying a plurality of words in said connected text;
   wherein said step of identifying a plurality of words in said connected text is comprised of performing a triangle scan iteration;
   wherein said triangle scan iteration is comprised of selecting various combinations of individual portions of said connected text;
   wherein said triangle scan iteration is performed in both a forward and reverse manner;
   wherein said triangle scan iteration is performed in a nonlinear, random manner;
   and translating said connected text to separated output text by adding a space or marker between each of said plurality of words;
   wherein said step of identifying a plurality of words includes creating a plurality of word matches sorted by a coordinate, permutating said plurality of word matches, and identifying a coordinate string with no overlapping characters containing two or more whole words.

9. The method of analyzing connected text of claim 8, including the step of providing said separated text to a software application.

10. The method of analyzing connected text of claim 9, including the step of said software application utilizing said separated text.

11. The method of analyzing connected text of claim 8, wherein said step of receiving connected text is comprised of receiving a text string without a space being input between at least two words.

12. The method of analyzing connected text of claim 8, wherein said step of receiving connected text is comprised of receiving a text string without any spaces being input.

13. The method of analyzing connected text of claim 8, including the step of validating the words within said coordinate string.

14. The method of analyzing connected text of claim 8, including the steps of identifying missing punctuation within said connected text and adding said missing punctuation.

\* \* \* \* \*